April 7, 1931. R. C. BURNLEY 1,799,149
TRAP
Filed Jan. 11, 1930 2 Sheets-Sheet 1
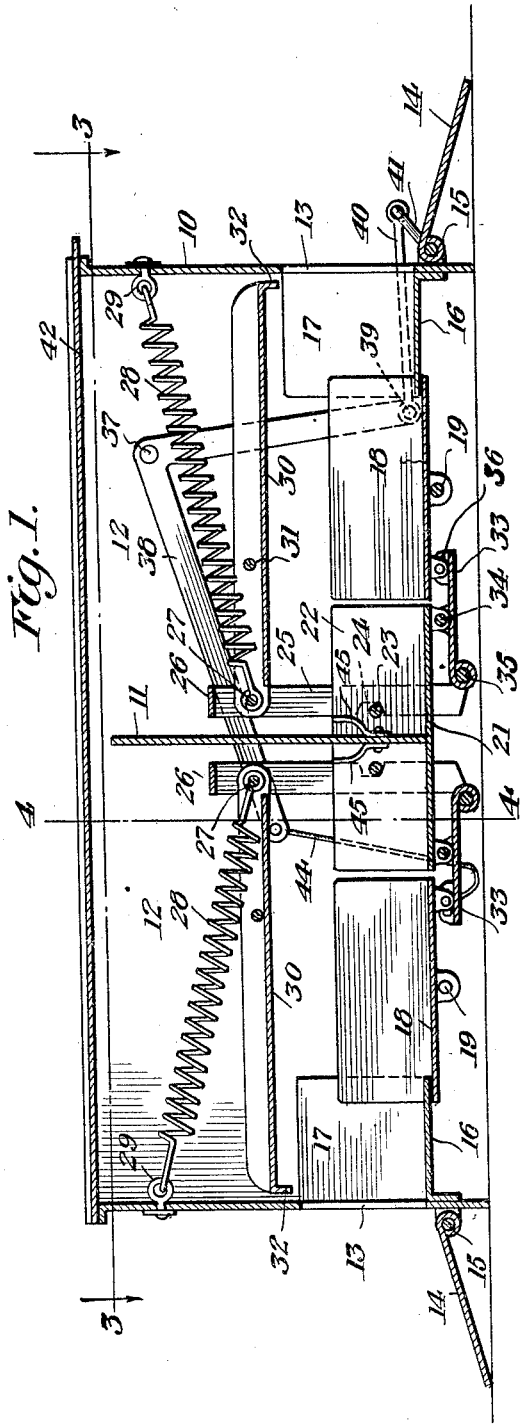
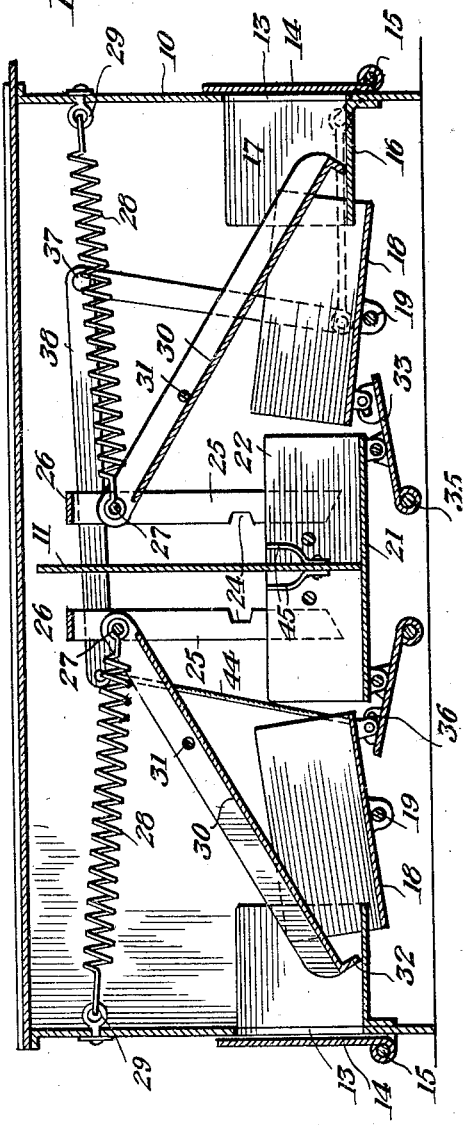
Robert C. Burnley
INVENTOR
BY Victor J. Evans
ATTORNEY

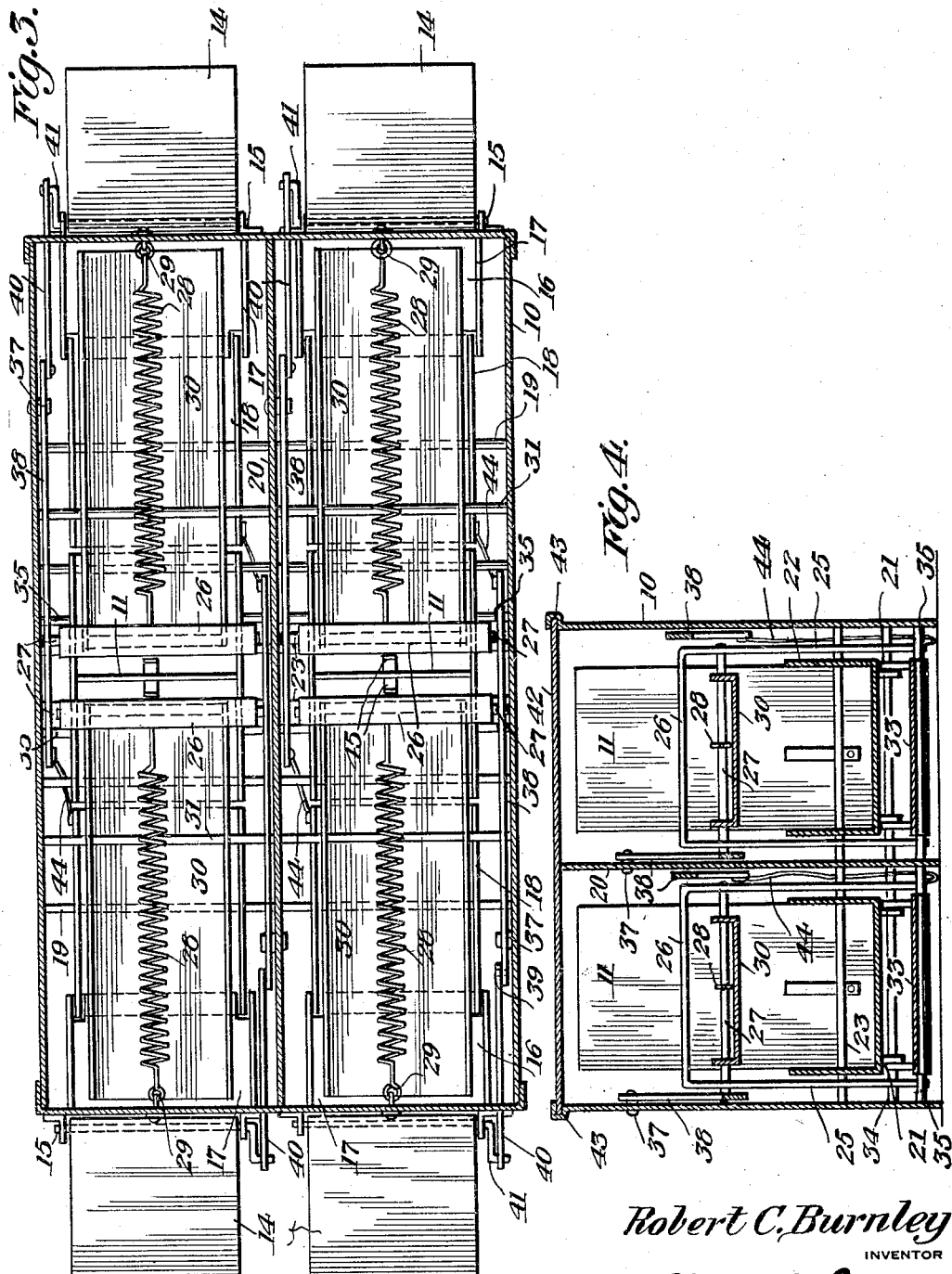

Patented Apr. 7, 1931

1,799,149

UNITED STATES PATENT OFFICE

ROBERT C. BURNLEY, OF LOUISVILLE, KENTUCKY

TRAP

Application filed January 11, 1930. Serial No. 420,259.

This invention relates to animal traps and has for an object the provision of a trap of novel construction which will operate to capture an animal, and at the same time instantly and humanely kill the animal.

Another object of the invention is the provision of a trap which may be built in multiples of two and arranged in pairs, means being provided for simultaneously operating a pair of traps when an animal enters one trap of the pair.

With the above and other objects in view, the invention further includes the following novel features and details of construction, to be hereinafter more fully described, illustrated in the accompanying drawings and pointed out in the appended claims.

In the drawings:—

Figure 1 is a longitudinal sectional view of a trap construction in accordance with the invention and shown in "set" position.

Figure 2 is a similar view showing the parts in the position occupied after the trap has been "sprung".

Figure 3 is a sectional view on the line 3—3 of Figure 1.

Figure 4 is a similar view on the line 4—4 of Figure 1.

Referring to the drawings in detail wherein like characters of reference denote corresponding parts, the reference character 10 indicates a housing which is divided by means of a partition 11 into separate compartments 12 and each of these compartments is provided with an entrance opening 13. The trap mechanism is duplicated for each compartment and includes a door 14 for closing the opening 13. This door is hingedly mounted as shown at 15 at the bottom of the opening 13, and when in open position serves as an entrance platform for the compartment 12.

Extending inward from the opening 13 is a vestibule which includes a floor 16 and side walls 17 which serve to direct the animal upon a platform 18. This platform is transversely trough-shaped and is pivotally mounted upon a rod 19 arranged transversely of the compartment 12.

It may be here stated that the trap may be built in multiples as shown in Figure 3 of the drawings, so that the pivot rod 19 for the platform 18 may extend through an adjacent trap compartment 12, a partition 20 dividing the adjacent compartments.

The partition 11 rises from a stationary platform 21, and this platform is provided with side walls 22 through which extend rods 23. These rods are adapted to engage within notches 24 provided in the edges of arms 25, the latter forming part of a yoke 26 which is disposed transversely within the inner end of the compartment 12. The yoke 26 carries a rod 27 and connected to this rod is one end of a spring 28. The opposite end of this spring is angled as at 29 so that the tendency of the spring is to pull the arms of the yoke from engagement with the rods 23.

Also pivotally connected to the rods 27 are striker plates 30. These plates are pivotally mounted as shown at 31 and are provided at one end with a flange 32, which, when the yoke 26 is operated and the plate 30 is moved under the action of the spring 28, this flange will strike the entering animal a blow, so that the animal will be instantly and humanely killed.

In order to hold the arms 25 engaged with the rod 23, a trigger 33 is pivotally mounted as shown at 34. One end of this trigger carries a rod 35 whose extended ends engage the arms 25 to hold the latter against movement. The opposite end of the trigger 33 has a sliding pivotal connection 36 with the pivoted platform 18.

Pivotally mounted within each compartment 12 as shown at 37 is an angle lever 38. One arm of this lever is pivotally connected as at 39 with one end of a link 40 and the opposite end of this link is pivotally secured to an arm 41 which is rigid with the door 14. The bar 27 which extends through the arms 25 has one of its ends extending beneath the angle lever 38, so that when the yoke and the arms 25 move upward, the lever 38 will be rocked upon the pivot 37 to close the door 14.

The housing 10 is provided with a cover 42 which is slidingly mounted within guides 43, and this cover may be removed so as to arrange the parts in the position shown in Figure 1 of the drawings. In this position, an animal entering the compartment 12 will tilt the platform 18, so that the inner end of this platform will be moved upward and will carry with it the connected end of the trigger 33. This movement of the trigger will cause the rod 35 to ride off the lower end of the arms 25 of the yoke 26, and the action of the spring 28 will suddenly force this yoke upward so as to disengage the arms 25 from the rod or stop 23. Upward movement of the yoke 26 will rock the lever 38, due to the engagement of this lever by the rod 27. This movement of the lever 38 will, through the link 40 and arm 41, close the opening 13. At the same time, upward movement of the yoke 26 will move the striker 30 pivotally upon the rod 31 so that the animal within the trap will be struck a sharp blow with the flange 32, the force of the blow being sufficient to instantly kill the animal.

The inner end of the angle lever 38 has a flexible connection 44 with the inner end of the platform 18 of the other compartment 12, as shown in Figure 1 of the drawings. Therefore, when the yoke 26 moves upward and carries with it the angle lever 38, the connection 44 will move this platform 18, and as the mechanism is duplicated in each of the compartments 12, the door of the other compartment will be closed. Both compartments will thus be simultaneously closed by an animal within one compartment, so that the animal will be effectually concealed from other animals approaching the trap.

Extending from opposite sides of the partition 11 are bait holders 45 of any suitable character.

The invention is susceptible of various changes in its form, proportions and minor details of construction and the right is herein reserved to make such changes as properly fall within the scope of the appended claims.

Having described the invention what is claimed is:—

1. In an animal trap, a housing having an entrance opening, a door to close the opening, a pivotally mounted lever operatively connected with the door to close the latter, a movable platform arranged within the trap in the path of an entering animal, an arm movable within the housing to actuate the lever and close the door, a stop arranged for engagement by the arm, spring means to disengage the arm from the stop and actuate the lever, and a trigger operatively connected with the platform and detachably engaging the lever to hold the latter engaged with the stop when the platform is in "set" position.

2. In an animal trap, a housing having an entrance opening, a door to close the opening, a pivotally mounted lever operatively connected with the door to close the latter, a movable platform arranged within the trap in the path of an entering animal, an arm movable within the housing to actuate the lever and close the door, a stop arranged for engagement by the arm, spring means to disengage the arm from the stop and actuate the lever, a trigger operatively connected with the platform and detachably engaging the arm to hold the latter engaged with the stop when the platform is in "set" position, and a striker member arranged above the platform and connected with the movable arm to strike an animal entering the trap when the movable platform is operated.

3. In an animal trap, a housing having an entrance opening, a door for the opening, a pivotally mounted lever, means connecting the lever and door to operate the latter when the lever is moved pivotally, a spring influenced movable arm within the housing to actuate the lever, a stop for engagement by the arm to hold the latter against movement, a pivotally mounted platform in the path of an animal entering the trap, a pivotally mounted trigger, means carried by the trigger to engage the arm and hold the latter in engagement with the stop, and means connecting the trigger and platform to actuate said trigger and release the arm when the platform is moved pivotally.

In testimony whereof I affix my signature.

ROBERT C. BURNLEY.